United States Patent
Gannot et al.

(10) Patent No.: US 9,997,170 B2
(45) Date of Patent: Jun. 12, 2018

(54) ELECTRONIC DEVICE AND REVERBERATION REMOVAL METHOD THEREFOR

(71) Applicants: SAMSUNG ELECTRONICS CO., LTD., Suwon-si (KR); BAR-ILAN RESEARCH & DEVELOPMENT COMPANY LTD., Ramat-Gan (IL)

(72) Inventors: Sharon Gannot, Ramat-Gan (IL); Emanuel A. P. Habets, Erlangen (DE); Ofer Shvarts, Ramat-Gan (IL); Nam-gook Cho, Suwon-si (KR)

(73) Assignees: SAMSUNG ELECTRONICS CO., LTD., Suwon-si (KR); Bar-Llan Research & Development Company Ltd., Ramat-Gan (IL)

( * ) Notice: Subject to any disclaimer, the term of this patent is extended or adjusted under 35 U.S.C. 154(b) by 0 days. days.

(21) Appl. No.: 15/517,855

(22) PCT Filed: Oct. 7, 2014

(86) PCT No.: PCT/KR2014/009405
§ 371 (c)(1),
(2) Date: Apr. 7, 2017

(87) PCT Pub. No.: WO2016/056683
PCT Pub. Date: Apr. 14, 2016

(65) Prior Publication Data
US 2017/0309294 A1    Oct. 26, 2017

(51) Int. Cl.
*H04B 3/20* (2006.01)
*G10L 21/0232* (2013.01)
(Continued)

(52) U.S. Cl.
CPC ...... *G10L 21/0232* (2013.01); *G10L 21/0272* (2013.01); *H04R 1/406* (2013.01);
(Continued)

(58) Field of Classification Search
CPC ............. G10L 21/0232; G10L 21/0272; G10L 2021/02082; G10L 2121/02166; H04R 1/406; H04R 3/005
See application file for complete search history.

(56) References Cited

U.S. PATENT DOCUMENTS

| 7,383,178 B2 | 6/2008 | Visser et al. |
| 8,160,262 B2 | 4/2012 | Buck et al. |

(Continued)

FOREIGN PATENT DOCUMENTS

| KR | 10-2004-0019362 A | 3/2004 |
| KR | 10-2005-0115857 A | 12/2005 |

(Continued)

OTHER PUBLICATIONS

Habets, E.A.P.; "Dual-Microphone Speech Dereverberation using a Reference Signal"; Technische Universiteit Eindhoven University of Technology; Proceedings of the IEEE International Conference on Acoustics, Speech, and Signal Processing; 2007; 5 pages total.
(Continued)

*Primary Examiner* — Andrew L Sniezek
(74) *Attorney, Agent, or Firm* — Sughrue Mion, PLLC (57) ABSTRACT

Provided are an electronic device and a reverberation removal method therefor. The reverberation removal method for an electronic device comprises: a plurality of microphone units for receiving a user's voice; a reverberation removal unit removing a reverberation component of the user's voice received from the plurality of microphone units so as to acquire an original component of the user's voice; a reverberation information acquisition unit for acquiring
(Continued)

information on the intensity of the reverberation component of the user's voice; and a post-processing unit for additionally removing a reverberation component from the original component acquired from the reverberation removal unit on the basis of the information on the intensity of the reverberation component.

8 Claims, 4 Drawing Sheets

(51) Int. Cl.
*G10L 21/0272* (2013.01)
*H04R 1/40* (2006.01)
*H04R 3/00* (2006.01)
*G10L 21/0208* (2013.01)
*G10L 21/0216* (2013.01)

(52) U.S. Cl.
CPC .... *H04R 3/005* (2013.01); *G10L 2021/02082* (2013.01); *G10L 2021/02166* (2013.01)

(56) References Cited

U.S. PATENT DOCUMENTS

| | | |
|---|---|---|
| 8,265,290 B2 | 9/2012 | Nakajima et al. |
| 8,271,277 B2 | 9/2012 | Kinoshita et al. |
| 8,284,947 B2 | 10/2012 | Giesbrecht et al. |
| 8,422,696 B2 | 4/2013 | Kim |
| 8,467,538 B2 | 6/2013 | Nakatani et al. |
| 2003/0026437 A1* | 2/2003 | Janse ............... H04R 3/005 381/71.4 |
| 2007/0055505 A1* | 3/2007 | Doclo ............... G10L 21/0208 704/226 |
| 2011/0058676 A1 | 3/2011 | Visser |
| 2012/0224714 A1* | 9/2012 | Couse ............... H04R 1/406 381/92 |

FOREIGN PATENT DOCUMENTS

| | | |
|---|---|---|
| KR | 10-2006-0061259 A | 6/2006 |
| KR | 10-2010-0010136 A | 2/2010 |
| KR | 10-2012-0054087 A | 5/2012 |

OTHER PUBLICATIONS

Sebastian Braun et al.; "An Informed Spatial Filter for Dereverberation in the Spherical Harmonic Domain"; Proceedings of the IEEE International Conference on Acoustics, Speech, and Signal Processing; 2013; 5 pages total.

Iain A. McCowan et al.; "Microphone Array Post-Filter Based on Noise Field Coherence"; IEEE Transactions on Speech and Audio Processing; vol. 11; No. 6; Nov. 2003; 8 pages total.

Stamatis Leukimmiatis et al.; "An Optimum Microphone Array Post-Filter for Speech Applications"; International Conference on Spoken Language Processing (ICSLP); 2006; 4 pages total.

Ofer Schwartz et al.; "Multi-Microphone Speech Dereverberation for Robust ASR: Final Report"; 2013; 16 pages total.

Written Opinion (PCT/ISA/237) dated Jun. 29, 2015 issued by the International Searching Authority in counterpart International Patent Application No. PCT/KR2014/009405.

Search Report (PCT/ISA/210) dated Jun. 29, 2015 issued by the International Searching Authority in counterpart International Patent Application No. PCT/KR2014/009405.

* cited by examiner

ELECTRONIC DEVICE AND REVERBERATION REMOVAL METHOD THEREFOR

TECHNICAL FIELD

The present invention relates to an electronic device and a reverberation removal method therefor, and more particularly, to an electronic device which can acquire an original component by removing a reverberation component from a user voice acquired a plurality of microphones and, and a reverberation removal method therefor.

BACKGROUND ART

In recent years, many electronic devices are providing a distant-talking mode that enables the electronic devices to acquire a user voice and make a call at a long distance. In particular, when a user voice is acquired by using the distant-talking mode in a specific space, it is difficult to smoothly acquire the user voice due to a reverberation component, which is generated by the user voice and various noises being reflected from wall surfaces of the space. In particular, a sound quality of a reflected signal may deteriorate rapidly as a reverberation time increases. In addition, when the reverberation component is used as an input to an automatic speech recognition (ASR) system, a success rate for acquisition of a user voice may be reduced rapidly.

To solve these problems, a related-art electronic device uses an algorithm for acquiring an original component of a user voice by removing a reverberation component from the user voice. In particular, technology of removing a reverberation component by using one microphone is provided, but the technology of removing the reverberation component by using one microphone shows outstanding performance in a specific condition. However, when the reverberation time increases or a distance between a speaker and a microphone is long, the technology of removing the reverberation component by using one microphone has a problem that it cannot effectively remove the reverberation component.

DETAILED DESCRIPTION OF THE PRESENT INVENTION

Technical Objects

The present invention has been developed in order to solve the above-mentioned problems, and an object of the present invention is to provide an electronic device which can remove a reverberation component from a user voice acquired from a plurality of microphones, and a reverberation removal method therefor.

Technical Solving Method

According to an exemplary embodiment of the present invention to achieve the above-described object, an electronic device includes: a plurality of microphone units configured to receive a user voice; a reverberation removal unit configured to acquire an original component of the user voice by removing a reverberation component of the user voice received from the plurality of microphone units; a reverberation information acquisition unit configured to acquire information on an intensity of the reverberation component of the user voice; and a post-processing unit configured to additionally remove a reverberation component from the original component acquired from the reverberation removal unit on the basis of the information on the intensity of the reverberation component.

In addition, the reverberation removal unit may be configured to acquire the original component of the user voice by removing the reverberation component of the user voice by using a minimum variance distortionless response (MVDR) beamformer.

In addition, the MVDR beamformer may be implemented by using a generalized sidelobe canceller.

In addition, the generalized sidelobe canceller may include: a fixed beamformer configured to extract a user voice of an original component from the user voice received from the plurality of microphone units; a blocking matrix configured to block the original component of the user voice received from the plurality of microphone units; and an adaptive noise canceller configured to adaptively cancel a reverberation component from the user voice of the original component by using the user voice with the original component removed.

In addition, the fixed beamformer may be a delay and sum (DS) beamformer.

In addition, the electronic device may further include an original component measurement unit configured to measure an original component from the plurality of microphone units, and the blocking matrix may be configured to block the original component of the user voice received from the plurality of microphone units by using the original component outputted from the original component measurement unit.

In addition, the reverberation removal unit may include: a fixed beamformer configured to extract a user voice of an original component from the user voice received from the plurality of microphone units; and a blind source separation (BSS)-based blocking matrix configured to block the original component of the user voice received from the plurality of microphone units.

In addition, the post-processing unit may be configured to remove, from the user voice of the original component outputted from the fixed beamformer, the reverberation component of the user voice by filtering the user voice with the original component removed, which is outputted from the BSS-based blocking matrix.

According to an exemplary embodiment of the present invention to achieve the above-described object, a method for removing a reverberation of an electronic device may include: a step of receiving a user voice via a plurality of microphones; a step of acquiring an original component of the user voice by removing a reverberation component of the user voice received from the plurality of microphones; a step of acquiring information on an intensity of the reverberation component of the user voice; and a post-processing step of additionally removing a reverberation component from the acquired original component on the basis of the information on the intensity of the reverberation component.

In addition, the step of acquiring the original component of the user voice may acquire the original component of the user voice by removing the reverberation component of the user voice by using a minimum variance distortionless response (MVDR) beamformer.

In addition, the MVDR beamformer may be implemented by using a generalized sidelobe canceller.

The step of acquiring the original component of the user voice may include: a step of extracting, by a fixed beamformer, a user voice of an original component from the user voice received from the plurality of microphones; a step of blocking, by a blocking matrix, the original component of the user voice received from the plurality of microphones;

and a step of adaptively cancelling, by an adaptive noise canceller, a reverberation component from the user voice of the original component by using the user voice with the original component removed.

In addition, the fixed beamformer may be a delay and sum (DS) beamformer.

In addition, the method may further include measuring an original component from the plurality of microphones, and the blocking matrix may be configured to block the original component of the user voice received from the plurality of microphones by using the original component.

The step of acquiring the original component of the user voice may include: a step of extracting, by a fixed beamformer, a user voice of an original component from the user voice received from the plurality of microphones; and a step of blocking, by a blind source separation (BSS)-based blocking matrix, the original component of the user voice received from the plurality of microphones.

In addition, the post-processing step may remove, from the user voice of the original component outputted from the fixed beamformer, the reverberation component of the user voice by filtering the user voice with the original component removed, which is outputted from the BSS-based blocking matrix

Advantageous Effect

According to various exemplary embodiments described above, by removing the reverberation component from the user voice acquired from the plurality of microphones, the electronic device can enhance a voice recognition rate in an environment where noises and reverberations are serious.

BEST MODE FOR EMBODYING THE INVENTION

Mode for Embodying the Invention

Various changes can be made to present exemplary embodiments and the embodiments may have various embodiments, and specific embodiments are illustrated in the drawings and will be described in the detailed description in detail. However, various exemplary embodiments of the present invention are not limited to the specific embodiments and should be construed as including modification, equivalent and/or alternative included in the idea and technical scope disclosed herein. In the following description, detailed descriptions of well-known technology will be omitted since they would unnecessarily obscure the subject matters of the present invention.

The terms such as "first" and "second" may be used to explain various elements, and does not limit the corresponding elements. These terms may be used for the purpose of distinguishing one element from another element.

The terms used in the present application are just for the purpose of describing particular exemplary embodiments and are not intended to limit the right scope. As used herein, the singular forms are intended to include the plural forms as well, unless the context clearly indicates otherwise. The terms "include" or "comprise" used in the present application indicate the presence of features, numbers, steps, operations, elements, and components described in the specification, or a combination thereof, and do not preclude the presence or addition of one or more other features, numbers, steps, operation, elements, or components, or a combination thereof.

In addition, a "module" or "unit" used in exemplary embodiments performs one or more functions or operations, and may be implemented by using hardware or software or a combination of hardware and software. In addition, a plurality of "modules" or a plurality of "units" may be integrated into one or more modules, except for a "module" or "unit" which needs to be implemented by specific hardware, and may be implemented as one or more processors (not shown).

Exemplary embodiments of the present disclosure will be described herein below with reference to the accompanying drawings. In the explanation of the drawings, the same reference numerals are used for the same or similar elements, and a redundant explanation regarding these will be omitted.

Figure 1:
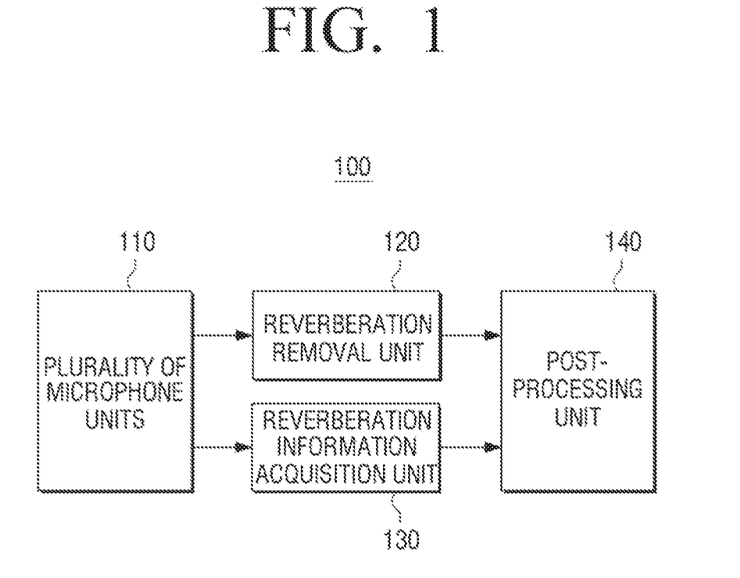
FIG. 1 is a block diagram illustrating a configuration of an electronic device for removing a reverberation component according to an exemplary embodiment of the present invention.

FIG. 1 is a block diagram illustrating a configuration of an electronic device 100 according to an exemplary embodiment of the present invention. As shown in FIG. 1, the electronic device 100 may include a plurality of microphone units 110, a reverberation removal unit 120, a reverberation information acquisition unit 130, and a post-processing unit 140. In this case, the electronic device 100 may be a device including a function of recognizing a user voice, such as a smart phone, a smart TV, a tablet PC, a notebook PC, a desktop PC, or the like.

The plurality of microphone units 110 receive a user voice. In this case, the plurality of microphone units 110 may be arranged in a single row.

The reverberation removal unit 120 removes a reverberation component of a user voice received from the plurality of microphone units 110 and acquires an original component of the user voice. In this case, the reverberation removal unit 120 may remove the reverberation component of the user voice and acquire the original component of the user voice using beamforming technology.

Specifically, beamforming is audio processing technology that can enhance directivity by maintaining a user voice received from a target, while removing energy received in the other directions. In particular, a beamformer is normally used to remove a noise and interference. In addition, when beamformers are oriented in the direction of allowing a sound field to directly arrive thereat, the beamformers can reduce a level of a reverberation component entering in the other directions. Therefore, the beamformers have potential for enhancing direct-to-reverberant ratio (DRR). In addition, due to the linearity of the beamformers, the beamformers may have fewer defects than non-linear processors.

In particular, the reverberation removal unit 120 may remove the reverberation component of the user voice using an MVDR beamformer. The MVDR beamformer may show the best directivity in a sound field spread with an isotropic property. In one embodiment of the present invention, the MVDR beamformer may be implemented by using a generalized sidelobe canceller (GSC). A method for removing a reverberation component of a user voice by using the GSC will be described with reference to FIG. 2. The reverberation of the user voice is removed by using the MVDR beamformer in the present invention, but this is merely an example. The reverberation component of the user voice may be removed by using other kinds of beamformers.

In another embodiment of the present invention, the reverberation removal unit 120 may remove the reverberation component of the user voice by using a blocking matrix based on blind source separation (BSS). A method for removing a reverberation component of a user voice by using the BSS-based blocking matrix will be described with reference to FIG. 3.

The reverberation information acquisition unit 130 may acquire information on the intensity of the reverberation component of the user's input inputted from the plurality of microphone units 110. In this case, the reverberation information acquisition unit 130 may acquire power spectral density (PSD) on the reverberation component of the user voice.

The post-processing unit 140 may additionally remove a reverberation component from the original component acquired from the reverberation removal unit 120 on the basis of the information on the intensity of the reverberation component acquired from the reverberation information acquisition unit 130.

Figure 2:
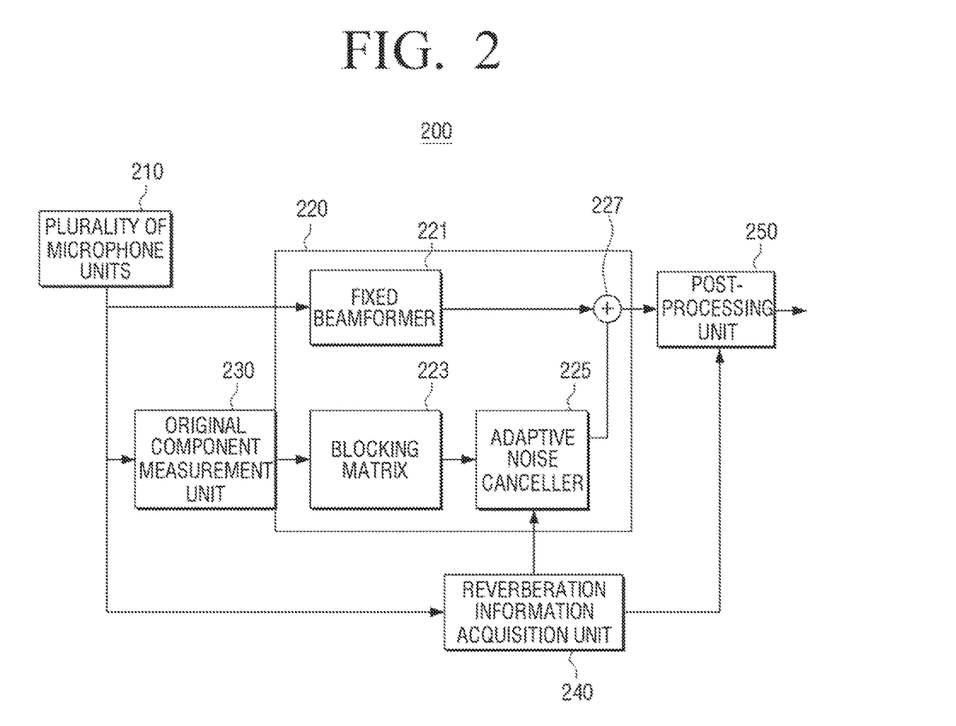
FIG. 2 is a block diagram showing a configuration of an electronic device for removing a reverberation component in detail according to an exemplary embodiment of the present invention.

Hereinafter, a method for removing a reverberation component of a user voice using a GSC in an electronic device 200 will be described with reference to FIG. 2. As shown in FIG. 2, the electronic device 200 includes a plurality of microphone units 210, a GSC unit 220, an original component measurement unit 230, a reverberation information acquisition unit 240, and a post-processing unit 250.

The plurality of microphone units 210 receive a user voice. In this case, the plurality of microphone units 210 may be arranged in a single row. In particular, the plurality of microphone unit 210 each may remove a part of a reverberation component using a single channel dereverberation algorithm.

The GSC unit 220 may remove the reverberation component of the user voice received from the plurality of microphone units 210, and acquire an original component of the user voice. In particular, the GSC unit 220 may include a fixed beamformer 221, a blocking matrix 223, an adaptive noise canceller 225, and an adder 227 as shown in FIG. 2.

The fixed beamformer 221 extracts a user voice of the original component from the user voice received from the plurality of microphone units 210. In this case, the fixed beamformer 221 may be implemented by using a delay and sum (DS) beamformer in order to reduce the level of the reverberation component.

Specifically, the fixed beamformer 221 may receive signals of different phases via the plurality of microphone units 210 and compensate for only the phase regarding a target signal, and then may extract a user voice of the original component having a reduced reverberation signal by adding the signals of the respective channels. In this case, since the fixed beamformer 221 compensates for only the phase of the original component of the user voice using N microphones, the level of the reverberation signal is reduced by 1/N.

The blocking matrix 223 blocks the original component of the user voice received from the plurality of microphone units 210. In addition, the blocking matrix 223 may block the original component of the user voice received from the plurality of microphone units using an original component measured by the original component measurement unit 230.

Specifically, the reverberation component of the user voice may be removed from all of the microphone units 210 by applying the single channel dereverberation algorithm to the plurality of microphone units 210. In addition, the original component measurement unit 230 measures the original component of the user voice signal with a part of the reverberation component removed from the plurality of microphone units 210. The original component of the user voice may be used to measure a relative transfer function (RTF) related to the original component of the user voice by a least-squares procedure. In addition, the blocking matrix 223 may block the original component of the user voice using the RTF related to the original component of the user voice, and may generate a reference signal regarding the reverberation component.

The adaptive noise canceller 225 may adaptively cancel the reverberation component from the user voice of the original component by using the user voice with the original component removed. Specifically, the adaptive noise canceller 225 may adaptively calculate a remaining reverberation component of the user voice by using the reference signal on the reverberation component, which is outputted from the blocking matrix 223, such that the reverberation component of the output of the fixed beamformer 221 is minimized. In addition, the adder 227 may remove the reverberation component from the original component of the user voice outputted from the fixed beamformer 221.

Since the reverberation component is non-stationary and a voice signal changes with time, the adaptive noise canceller 225 may be implemented by using a multichannel Wiener filter of a closed form rather than an adaptive LMS algorithm.

In addition, the adaptive noise canceller 225 may adaptively calculate the reverberation component of the user voice by using information on the intensity of the reverberation component acquired from the reverberation information acquisition unit 240.

The reverberation information acquisition unit 240 acquires the information on the intensity of the reverberation component of the user voice acquired from the plurality of microphone units 210. In this case, the reverberation information acquisition unit 240 may acquire a power spectral density (PSD) on the reverberation component of the user voice.

The post-processing unit 250 may additionally remove a reverberation component from the user voice of the original component, from which the reverberation component has been removed by the GSC unit 220, by using the information on the intensity of the reverberation component acquired from the reverberation information acquisition unit 240.

Specifically, most of the reverberation component is removed by the GSC unit 220, but, in order to additionally remove a remaining reverberation component, the post-processing unit 250 may calculate the remaining reverberation component of the original component outputted from the GSC unit 220 by using a coherence matrix of reverberations and noises, and may additionally remove the remaining reverberation component by using a single-channel postfilter. In this case, the post-processing unit 250 may remove a reverberation component of a room impulse response on the basis of the information on the intensity of the reverberation component acquired from the reverberation information acquisition unit 240.

In addition, the post-processing unit 250 may output, to voice recognition unit (not shown), the original component of the user voice with the remaining reverberation component removed.

As described above, by efficiently removing the reverberation component of the user voice by using the GSC, the electronic device 200 can enhance a success rate for acquisition of a voice.

Figure 3:
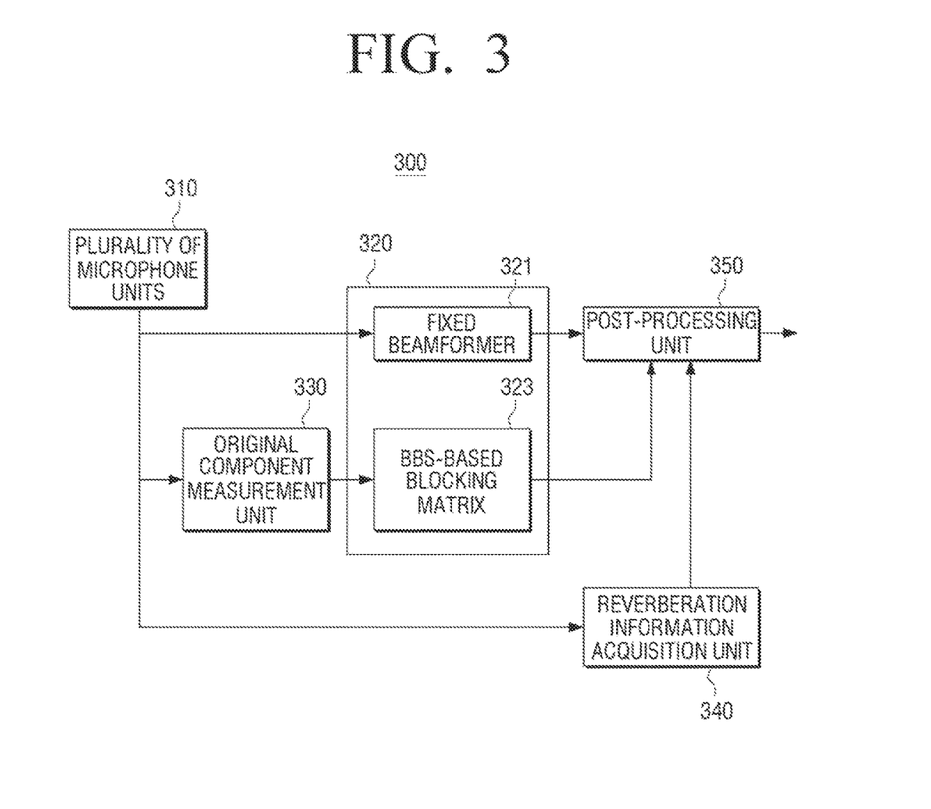
FIG. 3 is a block diagram illustrating a configuration of an electronic device for removing a reverberation component in detail according to another exemplary embodiment of the present invention.

FIG. 3 is a block diagram showing a configuration of an electronic device for removing a reverberation component by using blind source separation (BSS) technology in detail according to another exemplary embodiment of the present invention.

As shown in FIG. 3, the electronic device 300 includes a plurality of microphone units 310, a BSS-based reverberation removal unit 320, an original component measurement unit 330, a reverberation information acquisition unit 340, and a post-processing unit 350.

Redundant explanation of the plurality of microphone units 310, the original component measurement unit 330, the reverberation information acquisition unit 340, and the post-processing unit 350, which is the same as the plurality of microphone unit 210, the original component measurement unit 230, the reverberation information acquisition unit 240, and the post-processing unit 250 shown in FIG. 2, will be omitted.

The BSS-based reverberation removal unit 320 includes a fixed beamformer 321 and a BSS-based blocking matrix 323 as shown in FIG. 3. The fixed beamformer 321 extracts a user voice of an original component from a user voice received from the plurality of microphone units 310 in the same way as the fixed beamformer 221 of FIG. 2. In this case, the fixed beamformer 321 may be implemented by using a delay and sum (DS) beamformer in order to reduce the level of the reverberation component.

The BSS-based blocking matrix 323 may separate the original component of the user voice and the reverberation component on the basis of information on the original component of the user voice which is acquired from the original component measurement unit 330, and output the separated reverberation component to the post-processing unit 350. In this case, the BSS-based blocking matrix 323 may extract the reverberation component on the assumption that the reverberation component is conceptually located at a null in the original component. In particular, the BSS-based blocking matrix 323 may design a cost function including two constraint conditions in order to separate a voice signal form a mixed signal and remove the original component. In this case, the two constraint conditions include 1) decorrelation of a BSS algorithm output, and 2) a reverberation constraint condition.

In addition, the post-processing unit 350 may remove the reverberation component outputted from the BSS-based blocking matrix 323 from the original component of the user voice outputted from the fixed beamformer 321, on the basis of information on the intensity of the reverberation component acquired from the reverberation information acquisition unit 340.

As described above, by efficiently removing the reverberation component of the user voice by using the BSS technology, the electronic device 300 can enhance a success rate for recognition of a voice.

Figure 4:
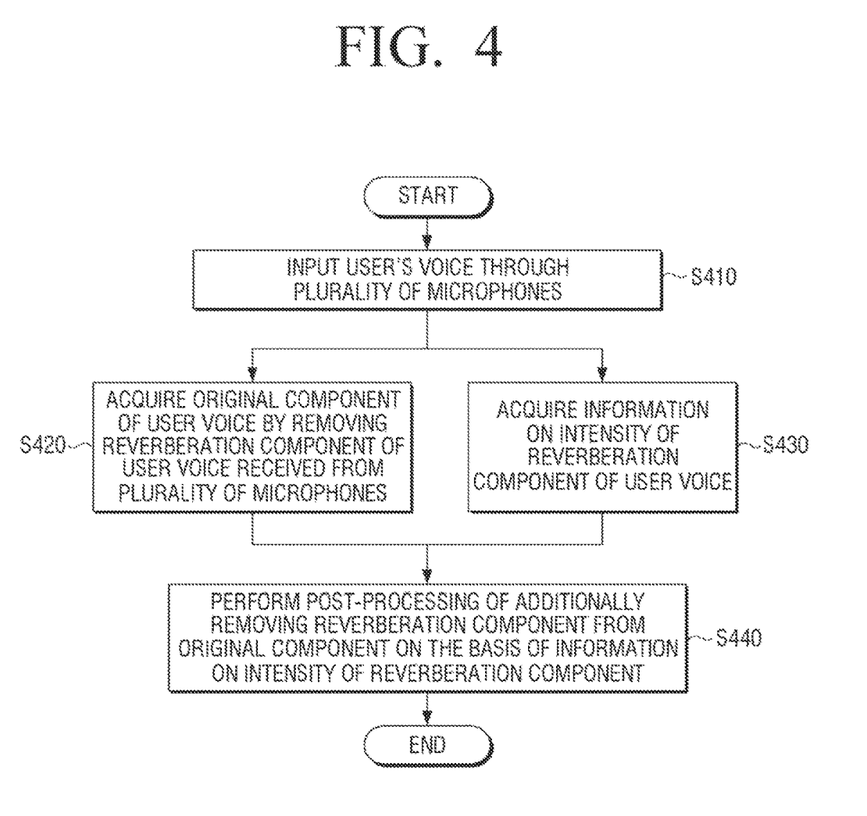
FIG. 4 is a flowchart to illustrate a method for removing a reverberation component of an electronic device according to an exemplary embodiment of the present invention.

FIG. 4 is a flowchart to illustrate a method for removing a reverberation of an electronic device according an exemplary embodiment of the present invention.

First, the electronic device 200 receives a user's voice through a plurality of microphones (S410).

In addition, the electronic device 100 acquires an original component of the user voice by removing a reverberation component of the user voice received from the plurality of microphones (S420). In this case, the electronic device 100 may remove the reverberation component by using a GSC as described in FIG. 2, or may remove the reverberation component by using BSS technology as described in FIG. 3.

In addition, the electronic device 100 acquires information on the intensity of the reverberation component of the user voice (S430). In this case, the electronic device 100 may acquire information on a PSD of the reverberation component.

In addition, the electronic device 100 may perform a post-processing operation of additionally removing a reverberation component from the original component acquired on the basis of the information on the intensity of the reverberation component (S440).

Accordingly, the electronic device 100 can acquire a more exact original component of the user voice, and can provide a voice recognition function of high performance.

Specific implementations in explanation of the embodiments are merely examples and do not limit the technical range in any method. To clarify the specification, related-art electronic components, control systems, software, and other functional aspects of the systems are not described. In addition, a connection of lines between components illustrated in the drawings, or connection members merely indicate functional connections and/or physical or circuit connections, and alternative or additional various functional connections, physical connections, or circuit connections may be provided in real devices.

The term "said" or other indicating terms similar thereto used in the detailed descriptions (in particular, the claims) may include a singular form and a plural form. In addition, the description of a range may include individual values falling within the range (unless otherwise specified), and is the same as describing the individual values forming the range. Finally, the steps constituting the method may be performed in appropriate order unless a specific order is described or otherwise specified. The steps are not limited to the above-described order. All of the examples or exemplary terms (for example, etc.) are simply used to describe the technical idea in detail, and the range is not limited by the above-described examples or exemplary terms as long as they are not limited by the claims. In addition, a person skilled in the art can know that various modification, combinations, and changes are made according to a design condition or factor within the range of the attached claims or equivalents thereof.

What is claimed is:
1. An electronic device comprising:
a plurality of microphone units configured to receive a user voice;
a reverberation reduction unit comprising:
a fixed beamformer configured to acquire an original component of the user voice by reducing a reverberation component of the user voice received from the plurality of microphone units;
a blocking matrix configured to block the original component of the user voice received from the plurality of microphone units; and
an adaptive noise canceller configured to adaptively cancel the reverberation component from the user voice of the original component by using the user voice with the original component reduced;

a reverberation information acquisition unit configured to acquire information on an intensity of the reverberation component of the user voice;

a post-processing unit configured to additionally reduce the reverberation component from the original component acquired from the reverberation reduction unit based on the information on the intensity of the reverberation component, and an original component measurement unit configured to measure the original component from the plurality of microphone units, wherein the blocking matrix is configured to block the original component of the user voice received from the plurality of microphone units by using the original component outputted from the original component measurement unit.

2. The electronic device of claim 1, wherein the reverberation reduction unit is configured to acquire the original component of the user voice by reducing the reverberation component of the user voice by using a minimum variance distortionless response (MVDR) beamformer.

3. The electronic device of claim 2, wherein the MVDR beamformer is implemented by using a generalized sidelobe canceller.

4. The electronic device of claim 1, wherein the fixed beamformer is a delay and sum (DS) beamformer.

5. A method for reducing a reverberation of an electronic device, the method comprising:

receiving a user voice via a plurality of microphones;

acquiring an original component of the user voice by reducing a reverberation component of the user voice received from the plurality of microphones;

acquiring information on an intensity of the reverberation component of the user voice; and additionally reducing the reverberation component from the acquired original component based on the information on the intensity of the reverberation component, measuring, by an original component measurement unit, the original component from a plurality of microphone units, wherein the acquiring the original component of the user voice comprises:

extracting, by a fixed beamformer, the original component of the user voice by reducing the reverberation component of the user voice received from the plurality of microphones;

blocking, by a blocking matrix, the original component of the user voice received from the plurality of microphones by using the original component outputted from the original component measurement unit; and adaptively cancelling, by an adaptive noise canceller, the reverberation component from the user voice of the original component by using the user voice with the original component reduced.

6. The method of claim 5, wherein the step of acquiring the original component of the user voice acquires the original component of the user voice by reducing the reverberation component of the user voice by using a minimum variance distortionless response (MVDR) beamformer.

7. The method of claim 6, wherein the MVDR beamformer is implemented by using a generalized sidelobe canceller.

8. The method of claim 5, wherein the fixed beamformer is a delay and sum (DS) beamformer.

* * * * *